United States Patent [19]

Schultz

[11] 4,305,786

[45] Dec. 15, 1981

[54] SHUTDOWN REACTIVITY METER SYSTEM FOR NUCLEAR FUEL STORAGE CELLS

[75] Inventor: Mortimer A. Schultz, North Palm Beach, Fla.

[73] Assignee: Wachter Associates, Inc., Gibsonia, Pa.

[21] Appl. No.: 11,285

[22] Filed: Feb. 12, 1979

[51] Int. Cl.³ .............................................. G21C 17/00
[52] U.S. Cl. ..................................... 376/254; 376/272
[58] Field of Search ....................... 176/19 EC, 19 R; 250/390–392

[56] References Cited

U.S. PATENT DOCUMENTS

| 3,366,544 | 1/1968 | Bunch | 176/19 EC |
| 3,424,653 | 1/1969 | Cohn | 176/19 EC |

FOREIGN PATENT DOCUMENTS

| 975742 | 6/1962 | France | 176/19 EC |

OTHER PUBLICATIONS

Control of Nuclear Power Plants, Shultz, (1955), McGraw Hill Book Co., Inc., p. 218.

Primary Examiner—S. A. Cangialosi
Attorney, Agent, or Firm—Thomas H. Murray

[57] ABSTRACT

A system for determining whether a self-sustaining neutron chain reaction (i.e., criticality) may occur as each successive nuclear fuel element is added to a liquid-filled tank. This is accomplished by determining whether a multiplication factor, k, approaches unity after each element is added to the tank in accordance with the equation:

$$CR = (\alpha S)/(1-k)$$

where:
S is the emission rate of the neutron source;
$\alpha$ is a term that reflects the detector sensitivity as well as the attenuation of the neutron between source and detector and various geometric considerations in the tank;
CR is the counting rate from a neutron detector; and
k is a multiplication factor of the assembly at any given time for any given element configuration.

1 Claim, 6 Drawing Figures

SHUTDOWN REACTIVITY METER SYSTEM FOR NUCLEAR FUEL STORAGE CELLS

BACKGROUND OF THE INVENTION

As is known, nuclear reactors consist of an array of fuel rods containing the nuclear fuel. The fuel rods are metal tubes, typically from 8 to 15 feet in length and about ½ inch in diameter, and are supported in groups of fuel assemblies which may comprise a considerable number of rods. The large reactors utilized for power generation contain a large number of these fuel assemblies arranged in a suitable configuration.

After an extended period of operation, the irradiated or spent fuel assemblies must be removed from the reactor and replaced. The spent fuel rods contain residual amounts of the original fuel material, and various amount of numerous fission products resulting from fission of the nuclei of the original fuel. Other nuclear reactions within the reactor transmute some of the elements present into new materials. Certain of these materials are themselves fissionable. Many of the fission products and new elements are highly radioactive, at least initially, and thus produce considerable heat and the entire fuel assembly is dangerously radioactive. The fuel rods can be reprocessed by chemically separating the fissionable material for reuse as fuel and recovering the various other fission products, or the fuel assemblies may be disposed of by placing them in permanent storage, or otherwise.

When radioactive fuel elements of the type described above are discharged from a nuclear reactor, they are normally stored, at least initially, in a water-filled pool which serves two purposes. The first of these purposes is to permit a cooling period to occur so that the radioactivity of the fuel assemblies may decline and they can be more easily handled. Secondly, the pool forms a convenient temporary storage place for the elements until some permanent disposal means such as reprocessing is employed.

Because of the cost of storage facilities for spent nuclear fuel assemblies, it is desirable to store as many elements as practical in the pool; and elaborate racks have been devised to permit close physical packing of these elements. The limiting factor in the number of fuel assemblies contained in a pool is the fact that the used fuel elements still contain fissionable materials as explained above; and if a given number of elements having a sufficient fissionable material content is placed together in certain configurations, the possibility exists that a self-sustaining neutron chain reaction (i.e., criticality) might be set up in the pool. It is, therefore, desirable to have available some form of instrumentation capable of monitoring the neutron multiplication in the pool to insure that criticality does not occur. As fuel assemblies are added or moved around within the pool, care must be taken that a neutron multiplication factor does not approach unity too closely. (A multiplication factor of 1 is called a critical condition and is that condition of the self-sustaining neutron chain reaction). The mutiplication factor (k) may be measured directly or the departure from criticality, loosely (k−1), which is called the reactivity, may be measured. Hence, the term shutdown reactivity meter is often employed as a generic name of such devices.

In the past, shutdown reactivity meters have been used principally in reactors that are capable of deliberately going critical. In particular, the critical point is usually used as a reference point in the calibration of the instrument. Two such devices have been prominently mentioned in the literature. The first of these consists of a neutron detector that is coupled to an analog or digital computer which solves the kinetic equations describing the physical behavior of reactors. One such device, for example, is described in an article by G. S. Stubbs entitled "Design and Use of the Reactivity Computer", IRE Transactions on Nuclear Science, March 1957. A reactivity metering system of this type can be operated in critical, subcritical (i.e., k less than unity) or supercritical (i.e., k greater than unity) modes but depends on dynamic signals from a neutron detector which can be calibrated at zero reactivity. A system of this sort is primarily used in large test or power reactors to measure control rod calibrations and shutdown reactivity. In its described form, it is not particularly suited to a potential reactor without control rods that presumably does not reach criticality.

The second type of shutdown reactivity meter operates on neutron noise signals from a detector monitoring the neutron power level in the reactor. One such meter, for example, is described in an article by M. A. Schultz, Applicant herein, entitled "Measurement of Shutdown Reactivity in Large Gamma Fields", Neutron Noise, Waves and Pulse Propagation, R. Uhrig, Ed, USAC Publication, May 1967. In this type of reactivity meter, the neutron noise signals are analyzed for frequency content; and from this information the transfer function, and hence the shutdown reactivity, can be inferred. Again, it is essential that the critical configuration transfer function be confirmed for the meter to be accurate. In addition, large efficient neutron detectors placed as closely as possible to the reactor must be used to obtain useful noise information. Furthermore, neither of the two above-described prior art systems are capable of reading multiplication factors below about 0.9.

SUMMARY OF THE INVENTION

In accordance with the present invention, radioactive neutron-emitting fuel elements are placed in succession in a liquid-filled tank wherein the addition of each successive fuel element will cause the aforesaid multiplication factor, k, to approach the critical value of unity in accordance with the equation:

$$CR_2/CR_1 = (\alpha_2/\alpha_1).(1-k_1)/(1-k_2)$$

In the foregoing equation, $CR_1$ is the neutron counting rate determined by a neutron counter before a successive fuel element is added or is an initial reference counting rate, $CR_2$ is the neutron counting rate determined by the neutron counter after the successive fuel element or elements are added, $\alpha_2/\alpha_1$ is a correction factor dependent upon the geometry of the liquid-filled tank and the positioning of the successive fuel element in relation to fuel elements already in the tank, $k_1$ is the multiplication factor which exists before the successive fuel element is added to the tank in accordance with the equation:

$$CR_1 = \alpha_1 S/(1-k_1)$$

where S is the emission rate of neutrons in the tank either from the fuel elements themselves or from a deliberate neutron source placed in the tank, and $k_2$ is the multiplication factor which exists after the successive fuel element is added to the tank in accordance with the equation:

$$CR_2 = \alpha_2 S/(1-k_2)$$

In carrying out the invention, the multiplication factor, $k_2$, is determined after each successive fuel element is added to the tank to determine whether criticality exists (i.e., whether $k_2$ is approaching unity). This is achieved by providing some form of neutron source in the tank and a neutron detector spaced from the source, together with computer means for electrical signals indicative of the quantities CR derived from the detector before and after each successive fuel element is added to the tank. The computer also includes memory means for storing a value indicative of $\alpha_2/\alpha_1$ for each element added to the tank based upon a given geometric positioning of fuel cells already in the tank. Finally, the computer includes means for computing the quantity $k_2$ after the insertion of each successive fuel element in the tank from the foregoing equation:

$$CR_2/CR_1 = (\alpha_2/\alpha_1).(1-k_1)/(1-k_2)$$

wherein $k_1$ is the stored value of the multiplication factor computed for the fuel element inserted into the tank before the aforesaid successive fuel element.

The above and other objects and features of the invention will become apparent from the following detailed description taken in connection with the accompanying drawings which form a part of this specification, and in which.

Figure 3:
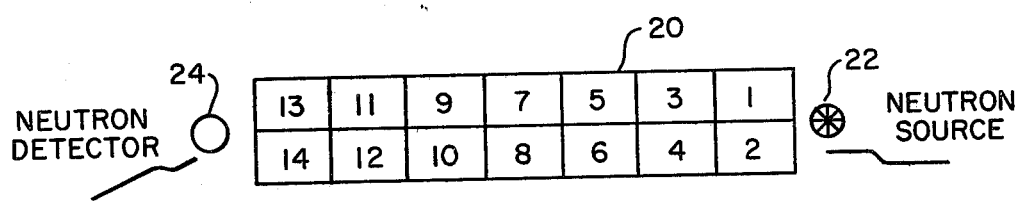
Figure 4:
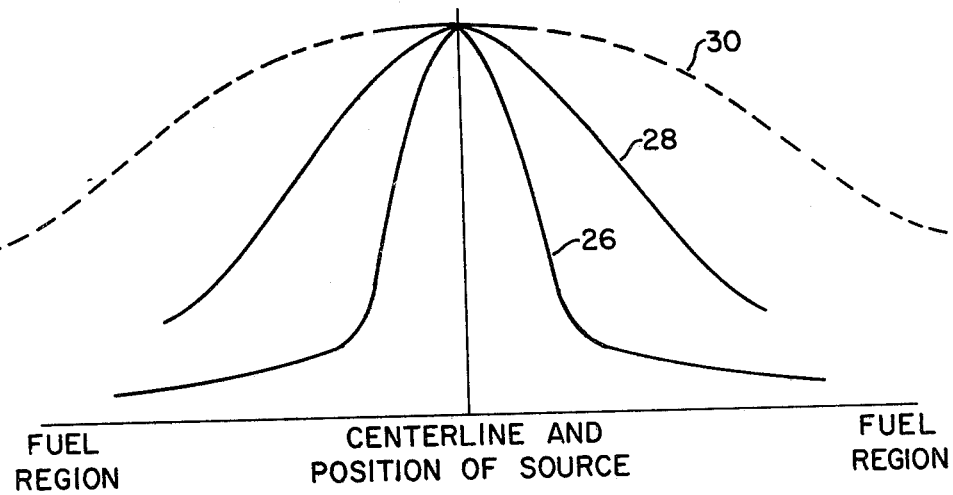
Figure 5:
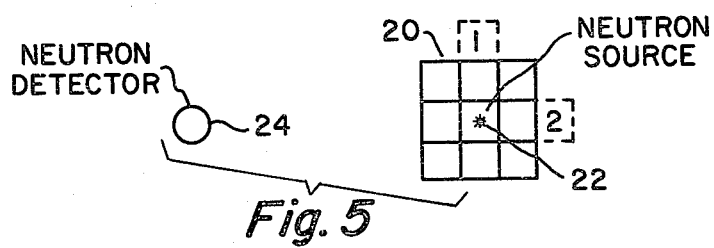
Figure 6:
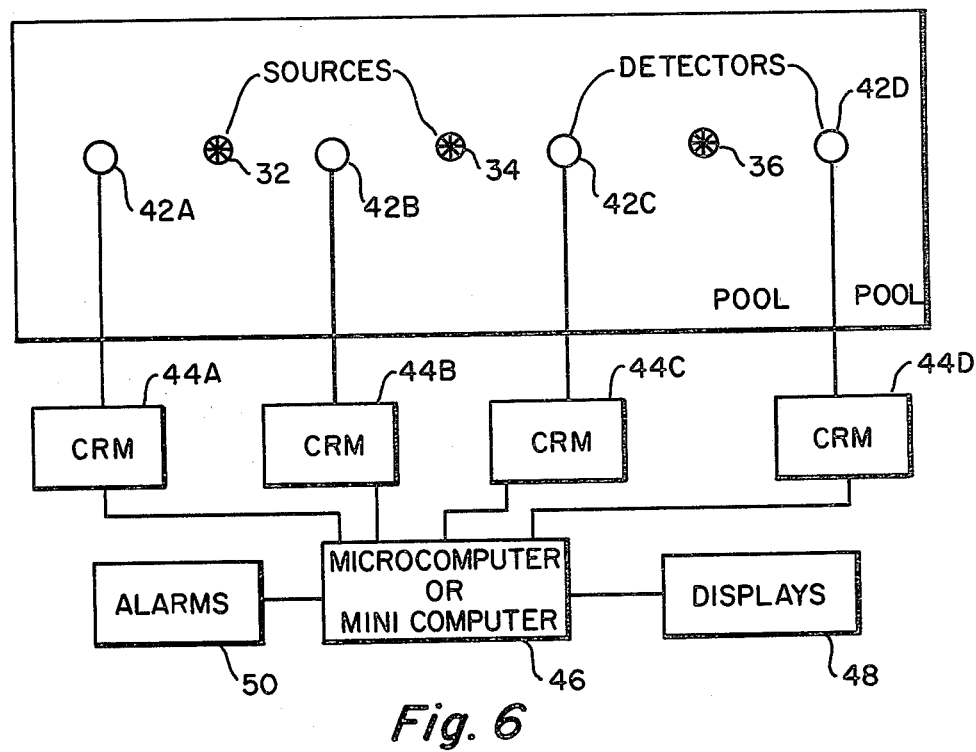

from the neutron detector versus the number of fuel elements inserted into a fuel storage rack showing the manner in which neutron counting rate increases as the number of fuel elements also increases;

FIG. 3 is a schematic illustration of a pool having fuel elements located therein, which illustrates source-to-detector attenuations when it is presumed that a discrete external source is used;

FIG. 4 illustrates the change in neutron flux distribution as a function of the amount of fissionable material which is added to a fuel storage tank when a discrete source is used;

FIG. 5 is a schematic illustration included for the purposes of showing changes in neutron detector reading as a function of the loading sequence of fuel assemblies in a storage tank; and FIG. 6 is a block schematic diagram of one type of computer system which may be utilized in accordance with the system of the invention.

DESCRIPTION OF THE PREFERRED EMBODIMENT

The drawings show an illustrative embodiment of the invention in a storage rack for spent nuclear fuel assemblies. The rack 10 is shown generally in FIG. 1 as comprising a plurality of identical rectangular storage cells 12 which can be aligned with each other in a regular or checkerboard array. The rack 10 is shown alone in FIG. 1 but it will be understood that it is intended to be immersed in a water-filled pit or pool or otherwise filled with water that may or may not contain other chemicals. The cells 12 are all identical and preferably square in cross section and are made of sufficient length to contain the fuel assemblies 14 to be stored. The cells, which are formed from partitions 16, are arranged in a regular array, and are preferably secured together by welding or in any other desired manner to form a modular structure. The cells 12 are preferably made of stainless steel which is a satisfactory structural material and which has the ability to absorb neutrons so that it also serves as a poison material. Any suitable material including those containing deliberate neutron absorbing elements may be used, however, for making the cells.

Figure 1:
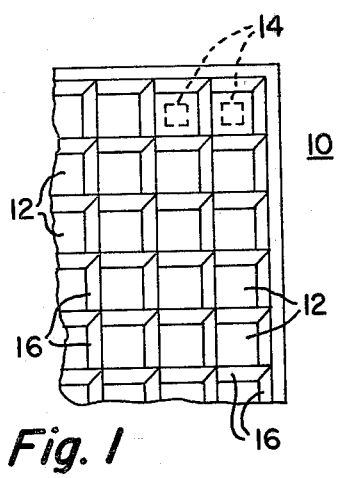
FIG. 1 is a top view of a typical storage facility for spent nuclear fuel assemblies with which the present invention may be used.

In carrying out the invention, a neutron source may be placed somewhere in the region of a storage rack, such as that of FIG. 1, where the nuclear fuel will eventually be located or the fuel elements themselves may be considered to be the neutron sources. A neutron detector or a series of detectors are placed inside or outside of the storage tank; and the counting rate of neutrons as they arrive at the detectors is observed. The nuclear fuel assemblies are then added to the region one at a time and the counting rate is observed as the fissionable material builds up the multiplication factor of the storage rack.

The counting rate detected by the neutron detector follows roughly the well-known subcritical multiplication formula:

$$CR = \alpha S/(1-k) \qquad (1)$$

where:

S is the neutron source emission rate;

$\alpha$ is a term that reflects sensitivity of the detector as well as the attenuation of the neutrons between source and detector, and various geometric considerations to be described later;

CR is the counting rate from the neutron detector and associated electronics; and k, as before, is the multiplication factor of the assembly at any given time for any given element configuration.

Figure 2:
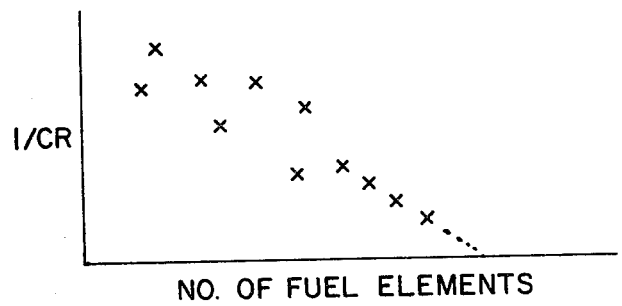
FIG. 2 is a plot of $$\frac{1}{\text{counting rate}}$$

A plot, such as the plot of FIG. 2, is usually made of the inverse counting rate, 1/CR, as a function of the number of fuel elements or fuel assemblies added to the storage tank. From this plot, it will be appreciated that the critical point will occur when 1/CR approaches zero. It will be noted from FIG. 2 that for low multiplication factors (i.e., high values of 1/CR), the points appear to be somewhat random. Meaningful predictive information from this plot is not available until high multiplication factors of k greater than approximately 0.9 have been reached. (See Equation (1) above.)

Before describing the invention in detail, and by way of background, it will first be assumed that a storage tank for spent fuel assemblies contains a neutron source and a detector, connected to the necessary electronics to form a count rate meter; and that fuel assemblies are being added to the pool one by one. (See FIG. 3.) If a reading is taken on the count rate meter connected to the detector when the multiplication factor is very low (multiplication factor, k, is unknown, but for illustrative purposes is assumed to be 0.1). Then:

$$CR_1 = \alpha_1 S/(1-k_1) \qquad (2)$$

where the "1" subscripts refer to this initial reading. Note that if $k_1$ were zero, $\alpha_1 S$ would be divided by 1, and if $k_1$ were 0.1, $\alpha_1 S$ would be divided by 0.9, not a large difference in counting rate. The significance of this point is that the first counting rate reading is not particularly sensitive to $k_1$.

Let it be further assumed that more and more fuel assemblies are now loaded into the tank or pool in some fixed geometric pattern, and assume further that it is desirable to stop the loading process at, say, k=0.95. The reading of the counting rate meter can then be represented as:

$$CR_2 = \alpha_2 S/(1-k_2) \quad (3)$$

where the "2" subscripts refer to the second reading after loading is stopped. The ratio of $CR_2/CR_1$ can be represented as:

$$CR_2/CR_1 = (\alpha_2/\alpha_1).(1-k_1)/(1-k_2) \quad (4)$$

In accordance with the present invention, the value of $k_2$ is calculated from the foregoing equation; and if $k_2$ is too close to unity, the loading process is stopped or other modifications are made since criticality is being approached. Assuming that $CR_2$, $CR_1$, and $k_1$ are known, $k_2$ can be computed from the foregoing equation simply if it is assumed that $\alpha_2/\alpha_1$ is unity. As a practical matter, however, $\alpha_2/\alpha_1$ is not unity and can vary and depends upon various geometric considerations. There are three principal reasons why the ratio of $\alpha_2$ to $\alpha_1$ is not unity. To begin with, the neutron source-to-detector attenuation will vary. This can be illustrated, for example, with the use of FIG. 3 where the numeral 20 designates a storage rack for nuclear fuel assemblies containing a plurality of cells numbered 1 through 14 for the respective fuel assemblies. The neutron source in FIG. 3 is identified by reference numeral 22; while the neutron detector is identified by the reference numeral 24. It will be assumed that the source 22 and detector 24 are initially in place with only water and structural material between them. A fuel assembly is then placed in cell No. 1 in the pool, followed by placing assemblies in cell Nos. 2, 3, 4, etc. From FIG. 3, it is apparent that the neutrons coming from the source must be attenuated differently by each addition of fuel material irrespective of the effective neutron multiplication.

The ratio of $\alpha_2$ to $\alpha_1$ also varies by virtue of a change in neutron flux distribution as illustrated in FIG. 4. With specific reference to FIG. 4, when a source is placed in the center of a low multiplication region, a neutron flux distribution results in the material that is sharply peaked in the neighborhood of the source and is indicated by curve 26 in FIG. 4. As more and more fissionable material is added to the assembly, the flux distribution changes its shape as indicated by curves 28 and 30 of FIG. 4. Curve 26 results from a low multiplication factor, k, curve 28 results from a higher multiplication factor, and curve 30 results when k is near unity. As the multiplication factor closely approaches unity, the flux distribution shape approaches that of an operating critical reactor. These changes in flux shape affect the reading of a count rate meter whose detector is placed in the vicinity of the assembly.

Finally, the ratio of $\alpha_2$ to $\alpha_1$ can vary due to changes in detector reading as a function of the loading sequence for nuclear reactor fuel assemblies. Consider, for example, the situation of FIG. 5 where a source 22 within a spent fuel pit 20 is initially symmetrically surrounded by a few fuel elements. The detector 24, for convenience, is shown as being displaced from the pit 20.

If it is now desired to add the next element (shown dotted in position 1 or 2 in FIG. 5), the addition of the next element in either position 1 or 2 increases the multiplication factor, k of the assembly by the same amount. Yet, it is obvious that the neutron detector 24 will read differently depending upon whether position 1 or position 2 is loaded next. The physical effect is a combination of the problems previously mentioned; but for ease of correction all effects may be considered to be a function of loading pattern.

It will also be apparent that if one were to start building up a fissionable mass in one end of the pool and another fissionable mass in the opposite end of the pool, at some point the two masses will begin to interact and each add to the multiplication factor of the other. Some form of coupling can exist in some types of large reactors and care must be taken that multiple reactors do not exist in the same pool.

In accordance with the present invention, the solution for all of these problems begins first by having a rigid loading sequence and pattern for the insertion of spent fuel assemblies into the storage pool. In this manner, the pool is always loaded in exactly the same way. The counting rate, CR, may now be considered as consisting of two parts: A counting rate that is dependent on the amount of fissionable material and poison present, and correction factor to the counting rate, $\alpha_2/\alpha_1$, that is essentially only positionally dependent. As each successive element is loaded, the actual counting rate is read, and this information, plus the position of the successive element in the pool, is fed into a small microcomputer or minicomputer associated with the counting rate meter. The computer contains a memory in which is stored the correction factor, $\alpha_2/\alpha_1$ for each pool position. The computer then proceeds to calculate and display the multiplication factor, $k_2$, based on the equation:

$$CR_2/CR_1 = (\alpha_2/\alpha_1).(1-k_1)/(1-k_2)$$

To make the correction factors smaller, the first multiplication factor, k, is not measured until a configuration similar to FIG. 3 is reached. In this way, drastic changes in source neutron attenuation are avoided.

The correction factors, $\alpha_2/\alpha_1$, for each pool position are determined empirically or can be obtained from mathematical considerations with the use of a large computer and sophisticated codes that are well known in the art. It will be noted from FIG. 2, for example, that as k approaches unity, the accuracy of the measurement becomes better, and depends more on the basic multiplication factor and less on the correction factor. Alarms and safety devices can be triggered when the calculated counting rate ratio used in the measurement is about twenty, which represents a large safety factor in not allowing a critical loading.

The multiple reactor coupling problem can be handled by multiple sources and detectors if the problem is shown to exist theoretically for a given pool design. Such an arrangement, for example, is shown in FIG. 6 where there are three neutron sources 32, 34 and 36 within a fuel storage pool 40 and four neutron detectors 42A, 42B, 42C and 42D. The detectors, in turn, are connected to four count rate meters 44A–44D which produce output electrical signals, each proportional to its associated count rate, which are fed to a small computer 46. This small computer includes a memory wherein the correction factors $\alpha_2/\alpha_1$ are stored for each fuel assembly with a given geometrical configuration based upon the assumption that the pool is always loaded in exactly the same way. Also stored in the computer 46 are the count rates obtained after the initial fuel assemblies were inserted into the pool. From these factors, the value of k for each fuel assembly loaded into the pool can be displayed on a display 48; and if k should closely approach unity, an alarm 50 can be actuated.

It should be noted that in an installation such as that shown in FIG. 6, the gamma ray environment of the neutron detectors is extremely hostile. Conventional fission counters have been shown to have long lives even in gamma fields up to $10^5$ R/hour. As the fields adjacent to a used fuel element immediately after reactor shutdown can be considerably higher than this amount, lead shielding or the like may be provided for the detectors. An efficient detector package would be one that occupies one fuel assembly cell. If this amount of shielding material were shown to be insufficient, however, it may be necessary to restrict moving the elements into the pool until a day or two after reactor shutdown. The sources, such as sources 32–36 shown in FIG. 6 do not have the same problem as the detectors in that they are small, can withstand the environment, and can be placed in suitable positions in the fuel assembly crate lattice.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. In a system wherein radioactive neutron-emitting elements are placed in succession in a liquid-filled tank and wherein the addition of each successive fuel element will cause a sub-critical multiplication factor, k, to approach a critical value of unity in accordance with the equation:

$$CR_2/CR_1 = (\alpha_2/\alpha_1)\cdot(1-k_1)/(1-k_2)$$

wherein $CR_1$ is the neutron counting rate determined by a neutron counter before said successive fuel element is added, $CR_2$ is the neutron counting rate determined by said neutron counter after said successive fuel element is added, $\alpha_2/\alpha_1$ is a correction factor dependent upon the geometry of said liquid-filled tank and the positioning of said successive fuel element in relation to fuel elements already in the tank, $k_1$ is a sub-critical multiplication factor which exists before said successive fuel element is added to the tank in accordance with the equation:

$$CR_1 = \alpha_1 S/(1-k_1)$$

where S is the emission rate of a neutron source in the tank, and $k_2$ is the sub-critical multiplication factor which exists after said successive fuel element is added to the tank in accordance with the equation:

$$CR_2 = \alpha_2 S/(1-k_2);$$

the method for determining the quantity $k_2$ after each successive fuel element is added to the tank comprising:
providing a neutron flux from a source in said tank;
counting the rate of neutron delivery (CR) to a detector location spaced from said source;
storing electrical signals indicative of the quantity CR at said detector location before and after each successive fuel element is added to the tank;
storing a value indicative of $\alpha_2/\alpha_1$ for each said fuel element added to the tank based upon a given geometric positioning of fuel elements already in the tank; and
computing $k_2$ after the insertion of each successive fuel element in the tank from the equation:

$$C_{r_2}/CR_1 = (\alpha_2/\alpha_1)\cdot(1-k_1)/(1-k_2)$$

where $k_1$ is the stored value of the sub-critical multiplication factor computed for the fuel element inserted into the tank before said successive fuel element and inserting additional neutron emitting elements into said liquid filled tank in selected locations such that the calculated value of $k_2$ after insertion remains below 1.0.

* * * * *